(12) United States Patent
Hsiao et al.

(10) Patent No.: US 9,470,920 B2
(45) Date of Patent: Oct. 18, 2016

(54) MOLD FRAME FOR CURVED DISPLAYING AND CURVED LIQUID CRYSTAL DISPLAY DEVICE USING SAME

(71) Applicant: Shenzhen China Star Optoelectronics Technology Co., Ltd., Shenzhen, Guangdong (CN)

(72) Inventors: Yuchun Hsiao, Guangdong (CN); Jiaxin Li, Guangdong (CN); Gang Yu, Guangdong (CN); Quan Li, Guangdong (CN); Dehua Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 322 days.

(21) Appl. No.: 14/378,635

(22) PCT Filed: May 28, 2014

(86) PCT No.: PCT/CN2014/078674
§ 371 (c)(1),
(2) Date: Aug. 13, 2014

(87) PCT Pub. No.: WO2015/172407
PCT Pub. Date: Nov. 19, 2015

(65) Prior Publication Data
US 2015/0346538 A1 Dec. 3, 2015

(30) Foreign Application Priority Data

May 14, 2014 (CN) .......................... 2014 1 0204387

(51) Int. Cl.
*G02F 1/1333* (2006.01)
(52) U.S. Cl.
CPC .................. *G02F 1/133308* (2013.01); *G02F 2001/133317* (2013.01); *G02F 2001/133322* (2013.01); *G02F 2201/465* (2013.01)

(58) Field of Classification Search
CPC combination set(s) only.
See application file for complete search history.

(56) References Cited

U.S. PATENT DOCUMENTS

| 2006/0290836 A1* | 12/2006 | Chang | G02B 6/0088 349/58 |
| 2011/0096262 A1* | 4/2011 | Kikuchi | G09F 9/301 349/58 |
| 2014/0133073 A1* | 5/2014 | Ahn | H01L 51/5237 361/679.01 |

* cited by examiner

*Primary Examiner* — Wen-Ying P Chen
(74) *Attorney, Agent, or Firm* — Andrew C. Cheng

(57) ABSTRACT

The present invention provides a mold frame for curved displaying and a curved liquid crystal display device using the mold frame. The mold frame for curved displaying includes two opposite first side frame members (11) and two opposite second side frame members (13) respectively mounted to two ends of the two first side frame members (11). Each of the first side frame members (11) includes a plurality of first engagement slots (115) and open notches (117) between two adjacent ones of the first engagement slots (115) formed therein. The first engagement slots (115) receive and are coupled to the first projection blocks (211) of the curved backplane the first side plates (21). The first side frame members (11) are made of an elastic plastic material. The first side frame members (11) show a flat and straight configuration before being assembled to a curved backplane and show a curved configuration after being assembled to the curved backplane. The mold frame for curved displaying has a simple structure is easy to design, manufacture, and inspect so as to help improve product yield rate and reduce manufacture costs.

15 Claims, 5 Drawing Sheets

MOLD FRAME FOR CURVED DISPLAYING AND CURVED LIQUID CRYSTAL DISPLAY DEVICE USING SAME

BACKGROUND OF THE INVENTION

1. Field of the Invention

The present invention relates to the field of liquid crystal displaying, and in particular to a mold frame for curved displaying and a manufacturing method thereof and a curved liquid crystal display device using same.

2. The Related Arts

Liquid crystal displays (LCDs) have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The backlight modules can be classified in two types, namely a side-edge backlight module and a direct backlight module, according to the site where light gets incident. The direct backlight module comprises a backlight source, such as a cold cathode fluorescent lamp (CCFL) or a light-emitting diode (LED), which is arranged at the backside of the liquid crystal panel so that the light is homogenized by passing through a diffusion plate to form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, with the progress of the liquid crystal displaying technology, major manufacturers have marketed curved liquid crystal display devices one after another. Generally speaking, the curved liquid crystal display devices allow for the best viewing effect from edge to edge, while a regular liquid crystal display device has generally poor capability of displaying at edges of a screen. The curved liquid crystal display devices have a screen that has a curved design to provide an effect of wide full-view image, allowing for the same visual enjoyment at both the central portion or the circumferential portion of the screen and also reducing distortion of off-axis viewing for viewing at a short distance. Further, the curved liquid crystal display device allows a viewer's viewing distance to be extended, achieving better experience of viewing. Thus, compared to the regular liquid crystal display devices, the curved liquid crystal display devices have advantages, including: (1) brand differentiating, (2) wider viewable angle, and (3) reducing distortion for short distance viewing.

Heretofore, a curved liquid crystal display device is manufactured in such a way that the liquid crystal display panel and the light guide plate and the optical film assembly of the backlight module are all made in curved forms. To accommodate the above-mentioned curved optical components, a curved frame made of steel or other materials is fixed to a flat backplane to forcibly curve the backplane. Also, a curved bezel is adopted to fix the curved liquid crystal display panel and a curved mold frame is used to fix the optical film assembly and support the curved liquid crystal display panel.

The mold frame is made of a plastic material through injection molding. The curved mold frame has a relatively complicated structure and this makes the design and manufacture of the injection mold thereof complicated. Further, the filling, shaping, and mold releasing operations of the injection molding process are difficult, making the curved mold frame hard to manufacture and the manufacturing cost high. After the completion of production through injection molding, it is also hard to carry out precise inspection of the dimensions of the curve of the mold frame, thereby leading to low yield rate of the final product and the quality not reliably secured.

SUMMARY OF THE INVENTION

An object of the present invention is to provide a mold frame of curved displaying, which has a simple structure and is easy for performance of injection molding, dimension inspection and assembly.

Another object of the present invention is to provide a curved liquid crystal display device using the mold frame in order to reduce the overall manufacturing cost and ensure the quality of the curved liquid crystal display device.

To achieve the above objects, the present invention provides a mold frame for curve displaying, which is adapted to be mounted to a curved backplane, wherein the curved backplane comprises two opposite curved first side plates and each of the first side plates comprises a plurality of first projection blocks formed therein. The mold frame comprises two opposite first side frame members and two opposite second side frame members respectively mounted to opposite ends of the two first side frame members. Each of the first side frame members comprises a plurality of first engagement slots and open notches formed between two adjacent ones of the first engagement slots. The first engagement slots receive and are coupled to the first projection blocks. The first side frame members are made of an elastic plastic material. The first side frame members show a straight configuration before being mounted to the curved backplane and show a curved configuration after being mounted to the curved backplane.

The first side plates are in the form of a curved configuration and the plurality of first projection blocks defines a center connection line that is curved, whereby when each of the first side frame members is mounted to the first side plate, collaboration of the plurality of first engagement slots and the corresponding plurality of first projection blocks makes the first side frame member curved to a condition of having a curvature that is substantially corresponding to curvature of the center connection line of the plurality of first projection blocks.

The curved backplane comprises two opposite second side plates. Each of the second side plates comprises a plurality of second projection blocks formed thereon. The second side frame members comprise a plurality of second engagement slots formed therein to correspond to the plurality of second projection blocks. The second side plates are set in an inclined condition. The second side frame members are made of an elastic plastic material and show a flat configuration and are assembled to the second side plates by having the plurality of second engagement slots receiving and coupled to the plurality of second projection blocks.

The elastic plastic material comprises a mixture of polycarbonate (PC) and glass fiber (GF), thermoplastic vulcanizate (TPV), or thermoplastic elastomer (TPE).

The first side frame members each comprises a first side wall and a first bearing wall perpendicularly connected to an inside surface of the first side wall. The first side walls are respectively mounted to the first side plates of the curved backplane. The plurality of first engagement slots is formed in the side walls, wherein the first side walls and the first bearing walls are both in a straight form before the first side walls are mounted to the first side plates and when the first side walls are mounted to the first side plates of the backplane, the first side walls force the first bearing walls connected thereto to curve to such a condition having a curvature substantially corresponding to curvature of the center connection line of the plurality of first projection blocks. The first bearing walls are configured for bearing and supporting a curved liquid crystal display panel.

The second side frame members each comprise a second side wall and a second bearing wall perpendicularly connected to an inside surface of the second side wall. The second side walls are mounted to the second side plates of the curved backplane. The plurality of second engagement slots is formed in the second side wall. The second bearing walls are configured for bearing and supporting a curved liquid crystal display panel.

The number of the plurality of first engagement slots is at least four distributed in an extension direction of the first side wall in such a manner of being spaced from each other and symmetric with respect to a center of the first side wall. The first engagement slots and the first projection blocks are both rectangular.

The second bearing wall comprises a first step adjacent to the second side wall and a second step connected to the first step. The second step has a height less than height of the first step. The first bearing wall of each of the first side frame members has two ends each forming an extension. The extensions are positioned on the second steps of the second side plates.

The present invention also provides a mold frame for curve displaying, which is adapted to be mounted to a curved backplane, wherein the curved backplane comprises two opposite curved first side plates and each of the first side plates comprises a plurality of first projection blocks formed therein, the mold frame comprising two opposite first side frame members and two opposite second side frame members respectively mounted to opposite ends of the two first side frame members, each of the first side frame members comprising a plurality of first engagement slots and open notches formed between two adjacent ones of the first engagement slots, the first engagement slots receiving and being coupled to the first projection blocks, the first side frame members being made of an elastic plastic material, the first side frame members showing a straight configuration before being mounted to the curved backplane and showing a curved configuration after being mounted to the curved backplane;

wherein the first side plates are in the form of a curved configuration and the plurality of first projection blocks defines a center connection line that is curved, whereby when each of the first side frame members is mounted to the first side plate, collaboration of the plurality of first engagement slots and the corresponding plurality of first projection blocks makes the first side frame member curved to a condition of having a curvature that is substantially corresponding to curvature of the center connection line of the plurality of first projection blocks;

wherein the curved backplane comprises two opposite second side plates, each of the second side plates comprising a plurality of second projection blocks formed thereon, the second side frame members comprising a plurality of second engagement slots formed therein to correspond to the plurality of second projection blocks, the second side plates being set in an inclined condition, the second side frame members being made of an elastic plastic material and showing a flat configuration and being assembled to the second side plates by having the plurality of second engagement slots receiving and coupled to the plurality of second projection blocks; and wherein the elastic plastic material comprises a mixture of polycarbonate (PC) and glass fiber (GF), thermoplastic vulcanizate (TPV), or thermoplastic elastomer (TPE).

The first side frame members each comprises a first side wall and a first bearing wall perpendicularly connected to an inside surface of the first side wall. The first side walls are respectively mounted to the first side plates of the curved backplane. The plurality of first engagement slots is formed in the side walls, wherein the first side walls and the first bearing walls are both in a straight form before the first side walls are mounted to the first side plates and when the first side walls are mounted to the first side plates of the backplane, the first side walls force the first bearing walls connected thereto to curve to such a condition having a curvature substantially corresponding to curvature of the center connection line of the plurality of first projection blocks. The first bearing walls are configured for bearing and supporting a curved liquid crystal display panel.

The second side frame members each comprise a second side wall and a second bearing wall perpendicularly connected to an inside surface of the second side wall. The second side walls are mounted to the second side plates of the curved backplane. The plurality of second engagement slots is formed in the second side wall. The second bearing walls are configured for bearing and supporting a curved liquid crystal display panel.

The number of the plurality of first engagement slots is at least four distributed in an extension direction of the first side wall in such a manner of being spaced from each other and symmetric with respect to a center of the first side wall. The first engagement slots and the first projection blocks are both rectangular.

The second bearing wall comprises a first step adjacent to the second side wall and a second step connected to the first step. The second step has a height less than height of the first step. The first bearing wall of each of the first side frame members has two ends each forming an extension. The extensions are positioned on the second steps of the second side plates.

The present invention further provides a curved liquid crystal display device, which comprises a backlight module, a mold frame mounted on the backlight module, a curved liquid crystal display panel mounted on the mold frame, and a curved bezel mounted on the curved liquid crystal display panel. The backlight module comprises a curved backplane and a curved light guide plate, a curved optical film assembly, and a backlight source arranged inside the curved backplane. The curved backplane comprises two opposite curved first side plates. Each of the first side plates comprises a plurality of first projection blocks formed therein. The mold frame comprises two opposite first side frame members and two opposite second side frame members respectively mounted to opposite ends of each of the two first side frame members. Each of the first side frame members comprises a plurality of first engagement slots and open notches between two adjacent ones of the first engagement slots formed therein. The first engagement slots receive and are coupled to the first projection blocks. The first side frame members are made of an elastic plastic material. The first side frame members show a straight configuration before being assembled to the curved backplane and show a curved configuration after being assembled with the curved backplane.

The curve backplane comprises a bottom board and a curved bracing mounted to the bottom board. The curved bracing is fixed by fastener to the bottom board of the backplane to force the bottom board and the first side plates to show a curved configuration.

The efficacy of the present invention is that the present invention provides a mold frame for curved displaying, in which an elastic plastic material is used a material for making the mold frame and the mold frame is made in the form of a knock-down mold frame made up of two first side frame members and two second side frame members. The first side frame members show a flat configuration before being assembled to a curved backplane and show a curved configuration after being assembled to the curved backplane and thus have a simple structure and is easy to design, manufacture, and inspect so as to help improve product yield rate and reduce manufacture costs. A curved liquid crystal display device using the mold frame can reduce overall manufacture costs and ensure quality of displaying.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
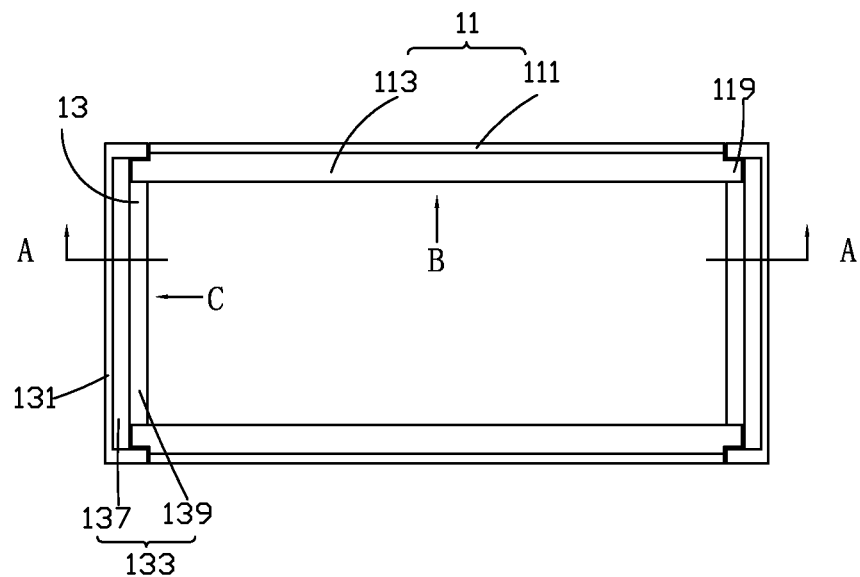
FIG. 1 is a simplified schematic view showing a mold frame for curved displaying according to the present invention in a condition before being assembled.
Figure 2:
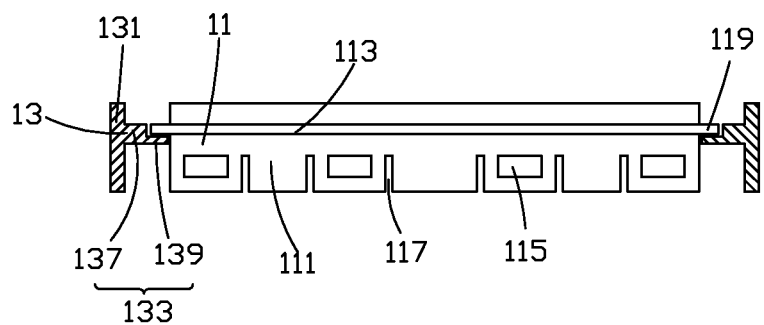
FIG. 2 is a cross-sectional view taken along line A-A of FIG. 1.
Figure 3:
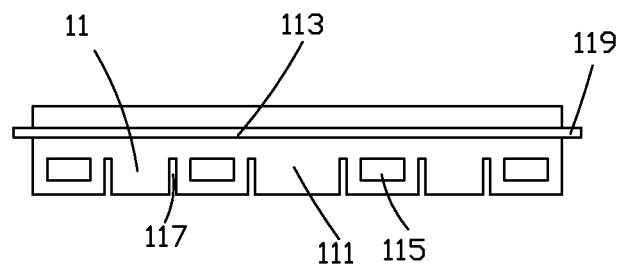
FIG. 3 is a simplified schematic view of a first side frame member of FIG. 1 taken in the direction of B.

To further expound the technical solution adopted in the present invention and the advantages thereof, a detailed description is given to a preferred embodiment of the present invention and the attached drawings.

Referring to FIGS. 1-8, the present invention provides a mold frame for curved displaying, which is mountable to a curved backplane to bear and support a curved liquid crystal display panel and comprises two opposite first side frame members 11 and two opposite second side frame members 13 that are respectively mounted to opposite ends of each of the two first side frame members 11. The first side frame members 11 shows a flat configuration before being mounted to the curved backplane and shows a curved configuration after being mounted to the curved backplane.

The curved backplane comprises two opposite curved first side plates 21 and two inclined second side plates 23 respectively mounted to opposite ends of each of the two first side plates 21. Each of the first side plates 21 comprises plurality of first projection blocks 211 formed thereon. The plurality of first projection blocks 211 defines a center connection line 213 that is curved. Each of the second side plates 23 comprises a plurality of second projection blocks 231 formed thereon.

The first side frame members 11 are respectively assembled to the first side plates 21 and the second side frame members 13 are respectively assembled to the second side plates 23.

The first side frame members 11 are arranged to curve in a curving direction of a curved liquid crystal display panel and each comprises a first side wall 111 and a first bearing wall 113 perpendicularly connected to an inside surface of the first side wall 111. The first side wall 111 is assembled to the corresponding first side plate 21 of the curved backplane and the first bearing wall 113 bears and supports the curved liquid crystal display panel. The first side wall 111 comprises a plurality of first engagement slots 115 formed thereon to correspond to the plurality of first projection blocks 211 of the first side plate 21. Specifically, the number of the plurality of first engagement slots 115 is at least four and they are distributed in an extension direction of the first side wall 111 in such a manner of being spaced from each other and being symmetric with respect to a center of the first side wall 111. Open notches 117 are formed between two adjacent ones of the first engagement slots 115. Preferably, the number of the open notches 117 formed between two adjacent first engagement slots 115 is two. The open notches 117 each have an opening facing away from the first bearing wall 113. The open notches 117 help the first side wall 111 to deform and curve. Further, the first engagement slots 115 can be of a regular shape, such as a rectangle, a circle, and an isosceles trapezoid. Preferably, the shape of the first engagement slots 115 is rectangular for easy design and manufacture. The first projection blocks 211 have a shape that is complementary to that of the first engagement slots 115 and is rectangular in the instant embodiment. It is noted that the first bearing wall 113 has two ends each forming an extension 119.

The second side frame members 13 comprises a second side wall 131 and a second bearing wall 133 perpendicularly connected to an inside surface of the second side wall 131.

The second side wall 131 is assembled with the corresponding second side plate 23 of the curved backplane. The second bearing wall 133 bears and supports the curved liquid crystal display panel. The second side wall 131 comprises a plurality of second engagement slots 135 formed thereon to correspond to the plurality of second projection blocks 231 of the second side plate 23. Specifically, the plurality of second engagement slots 135 are distributed in an extension direction of the second side wall 131 in such a way of being spaced from each other and may be of a regular shape, such as a rectangle, a circle, and an isosceles trapezoid. Preferably, the shape of the second engagement slots 135 is rectangular. The second projection blocks 231 are of a shape that is complementary to that of the second engagement slots 135 ad is also rectangular in the instant embodiment. The second bearing wall 133 comprises a first step 137 that is adjacent to the second side wall 131 and a second step 139 connected to the first step 137. The second step 139 has a less greater than height of the first step 137.

The first and second side frame members 11, 13 are both made of elastic plastic materials. The elastic plastic materials may include: a mixture of polycarbonate (PC) and glass fiber (GF), thermoplastic vulcanizate (TPV), and thermoplastic elastomer (TPE), each of the above materials having excellent elasticity. The first and second side frame members 11, 13 are thus provided with an excellent property of elasticity.

Before the first side walls 111 of the first side frame members 11 are assembled to the first side plates 21 of the curved backplane, the first side walls 111 and the first bearing walls 113 are both flat and straight, meaning the first side frame members 11 are straight and flat, allowing the first side frame members 11 to have a simple structure and being easy to design and manufacture.

When first side walls 111 of the first side frame members 11 are assembled to the first side plates 21 of the curved backplane, the plurality of first engagement slots 115 are fit over and coupled to the plurality of first projection blocks 211. Since the first side frame members 11 have excellent elasticity, the collaboration of the plurality of first engagement slots 115 and the corresponding plurality of first projection blocks 211 makes the first side walls 111 to force the first bearing walls 113 connected thereto to curve to such an extent of having a curvature substantially corresponding to that of the center connection line 213 of the plurality of first projection blocks 211. In other words, the first side frame members 11 are curved to such a condition of having a curvature substantially corresponding to that of the center connection line 213 of the plurality of first projection blocks 211 and showing a curved configuration illustrated in FIG. 5, so as to match the curvature of the curved liquid crystal display panel to better support the curved liquid crystal display panel. Since the open notches 117 are formed between two adjacent ones of the first engagement slots 115, the first side frame members 11 are readily curved during the assembling process.

Figure 6:
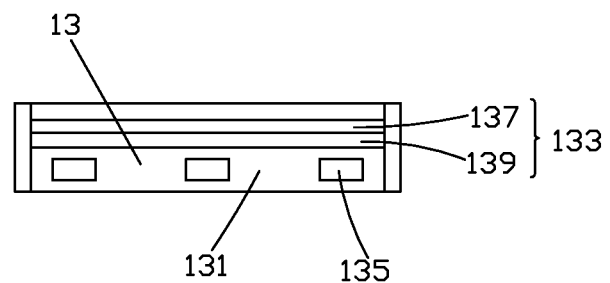
FIG. 6 is a simplified schematic view of a second side frame member of FIG. 1 taken in the direction of C.
Figure 7:
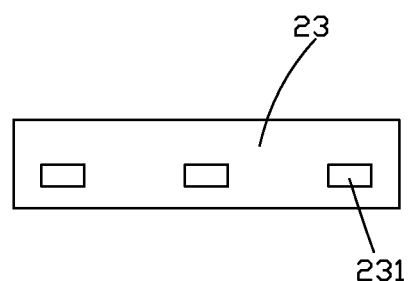
FIG. 7 is a simplified schematic view showing a second side plate of the curved backplane corresponding to a second side frame member.
Figure 8:
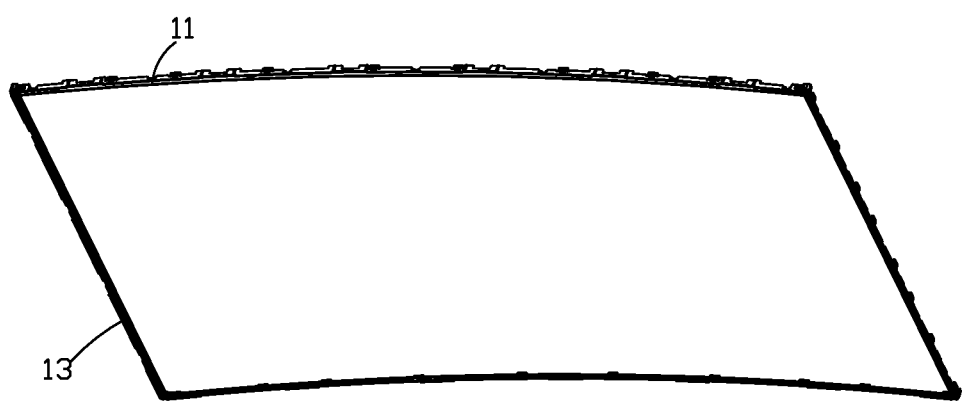
FIG. 8 is a perspective view showing the mold frame for curved displaying according to the present invention in a condition of being assembled.

The second side frame members 13 are flat and straight. When the second side walls 131 of the second side frame members 13 are assembled to the second side plates 23 of the curved backplane, the plurality of second engagement slots 135 are fit over and coupled to the plurality of second projection blocks 231 to thereby assemble the second side frame members 13 to the second side plates 23 of the curved backplane. Preferably, the fitting formed between the plurality of second engagement slots 135 and the plurality of second projection blocks 231 is tight fitting. Since the second side plates 23 are inclined but not curved, the second side frame members 13 maintain flat and straight after being assembled to the second side plates 23 and show a flat and straight condition as illustrated in FIG. 6. It is noted that the extensions 19 of each of the first bearing walls 113 are positionable on the second steps 139 of the second side plates 13 to provide better support to the curved liquid crystal display panel and also to shield light.

The mold frame for curved displaying has a simple structure and is easy to design, manufacture, inspect, and assemble. Specifically, the manufacture of the mold frame for curved displaying comprises the following steps:

Step 1: a designer uses 3D drawing software to individually prepare drawings of the first side frame members 11 and the second side frame members 13. To ensure the assembleability of the first side frame members 11 and the curved backplane, the designer prepares drawings of the first side frame members 11 in a curved form under a condition of being assembled, while the second side frame members 13 are drawn to show a flat and straight form.

Step 2: the designer uses 3D drawing software to convert the curved form of the first side frame members 11 into a flat form and forwards the drawing sheets of the converted and flat first side frame members 11 and the second side frame members 13 to a manufacturing unit.

Step 3: the manufacturing unit follows the received drawing sheets to individually manufacture molds for making flat first side frame members 11 and second side frame members 13 and proceeds with injection molding.

Step 4: the sizes of the flat first side frame members 11 and the second side frame members 13 are inspected and if they are acceptable, then the process goes to Step 5.

Step 5: the first side frame members 11 and the second side frame members 13 are respectively assembled to first and second side plates 21, 23 of a curved backplane by having the plurality of first engagement slots 115 of the first side frame members 11 fit to the plurality of first projection blocks 211 of the curved first side plates 21, whereby the collaboration of the plurality of first engagement slots 115 and the corresponding plurality of first projection blocks 211 forces the first side frame members 11 to show a curved configuration, and the plurality of second engagement slots 135 of the second side frame members 13 are fit to the plurality of second projection blocks 231 of the inclined second side plates 23 to complete the assembly of the mold frame for curved displaying.

The 3D drawing software used in Step 1 and Step 2 has a function of converting the first side frame members 11 from a curved form into a flat form. Commonly available drawing software, such as UG, Pro/E, CATIA, generally provides such as function.

Figure 4:
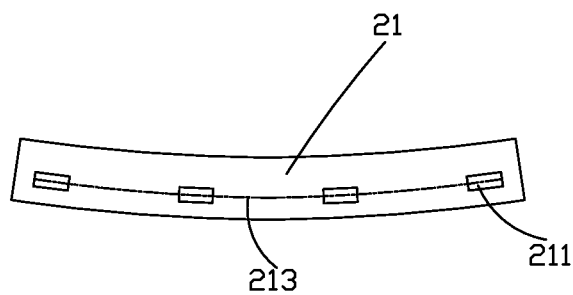
FIG. 4 is a simplified schematic view showing a first side plate of a curved backplane corresponding to a first side frame member.
Figure 5:
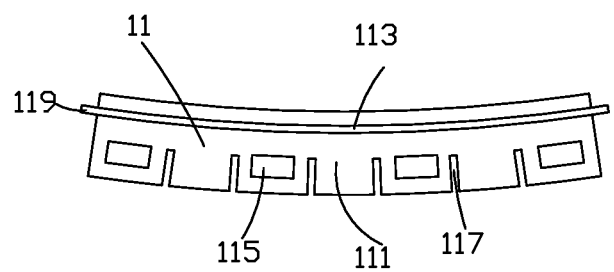
FIG. 5 is a simplified schematic view showing the first side frame member of the mold frame for curved displaying according to the present invention in a condition of being assembled.
Figure 9:
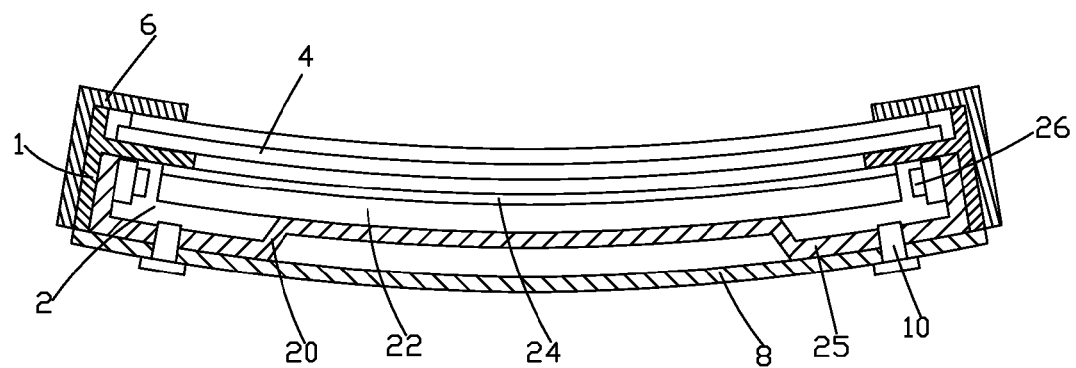
FIG. 9 is a cross-sectional view showing a curved liquid crystal display device using the mold frame according to the present invention.

Referring to FIG. 9, the present invention also provides a curved liquid crystal display device using the mold frame and comprising a backlight module 2, a mold frame 1 mounted on the backlight module 2, a curved liquid crystal display panel 4 mounted on the mold frame 1, and a curved bezel 6 mounted on the curved liquid crystal display panel 4. The backlight module 2 comprises a curved backplane 20 and a curved light guide plate 22, a curved optical film assembly 24, and a backlight source 26 arranged inside the curved backplane 20. Referring to FIG. 4, the curved backplane 20 comprises two opposite curved first side plates 21. Each of the first side plates 21 comprises a plurality of first projection blocks 211 formed therein. Referring to FIGS. 1, 2, 3, and 5, the mold frame 1 comprises two opposite first side frame members 11 and two second side frame members 13 respectively mounted to opposite ends of each of the two first side frame members 11. Each of the first side frame members 11 comprises a plurality of first engagement slots 115 and open notches 117 between two adjacent ones of the first engagement slots 115 formed therein. The first engagement slots 115 receive and are coupled to the first projection blocks 211. The first side frame members 11 are made of an elastic plastic material. The first side frame members 11 show a flat configuration before being assembled to the curved backplane 20 so as to have a simple structure and be easy to design, manufacture, and inspect and have a low manufacture cost and show a curved configuration after being assembled with the curved backplane 20 so as to better support the curved liquid crystal display panel 4 to ensure quality of displaying.

The curve backplane 20 comprises a bottom board 25 and a curved bracing 8 mounted to the bottom board 25. The curved bracing 8 is coupled by fasteners 10 to the bottom board 25 of the backplane 20 to force the bottom board 25 and the first side plates 21 to show a curved configuration. The first and second side plates 21, 23 are respectively connected to sides of the bottom board 25.

The descriptions of the mold frame for curved displaying and the curve backplane given previously are also applicable to the curved liquid crystal display device according to the present invention.

In summary, the present invention provides a mold frame for curved displaying, in which an elastic plastic material is used a material for making the mold frame and the mold frame is made in the form of a knock-down mold frame made up of two first side frame members and two second side frame members. The first side frame members show a flat configuration before being assembled to a curved backplane and show a curved configuration after being assembled to the curved backplane and thus have a simple structure and is easy to design, manufacture, and inspect so as to help improve product yield rate and reduce manufacture costs. A curved liquid crystal display device using the mold frame can reduce overall manufacture costs and ensure quality of displaying.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A mold frame for curve displaying, which is adapted to be mounted to a curved backplane, wherein the curved backplane comprises two opposite curved first side plates and each of the first side plates comprises a plurality of first projection blocks formed therein, the mold frame comprising two opposite first side frame members and two opposite second side frame members respectively mounted to opposite ends of the two first side frame members, each of the first side frame members comprising a plurality of first engagement slots and open notches formed between two adjacent ones of the first engagement slots, the first engagement slots receiving and being coupled to the first projection blocks, the first side frame members being made of an elastic plastic material, the first side frame members showing a straight configuration before being mounted to the curved backplane and showing a curved configuration after being mounted to the curved backplane.

2. The mold frame for curved displaying as claimed in claim 1, wherein the first side plates are in the form of a curved configuration and the plurality of first projection blocks defines a center connection line that is curved, whereby when each of the first side frame members is mounted to the first side plate, collaboration of the plurality of first engagement slots and the corresponding plurality of first projection blocks makes the first side frame member curved to a condition of having a curvature that is substantially corresponding to curvature of the center connection line of the plurality of first projection blocks.

3. The mold frame for curved displaying as claimed in claim 1, wherein the curved backplane comprises two opposite second side plates, each of the second side plates comprising a plurality of second projection blocks formed thereon, the second side frame members comprising a plurality of second engagement slots formed therein to correspond to the plurality of second projection blocks, the second side plates being set in an inclined condition, the second side frame members being made of an elastic plastic material and showing a flat configuration and being assembled to the second side plates by having the plurality of second engagement slots receiving and coupled to the plurality of second projection blocks.

4. The mold frame for curved displaying as claimed in claim 1, wherein the elastic plastic material comprises a mixture of polycarbonate (PC) and glass fiber (GF), thermoplastic vulcanizate (TPV), or thermoplastic elastomer (TPE).

5. The mold frame for curved displaying as claimed in claim 2, wherein the first side frame members each comprises a first side wall and a first bearing wall perpendicularly connected to an inside surface of the first side wall, the first side walls being respectively mounted to the first side plates of the curved backplane, the plurality of first engagement slots being formed in the side walls, wherein the first side walls and the first bearing walls are both in a straight form before the first side walls are mounted to the first side plates and when the first side walls are mounted to the first side plates of the backplane, the first side walls force the first bearing walls connected thereto to curve to such a condition having a curvature substantially corresponding to curvature of the center connection line of the plurality of first projection blocks, the first bearing walls being configured for bearing and supporting a curved liquid crystal display panel.

6. The mold frame for curved displaying as claimed in claim 3, wherein the second side frame members each comprise a second side wall and a second bearing wall perpendicularly connected to an inside surface of the second side wall, the second side walls being mounted to the second side plates of the curved backplane, the plurality of second engagement slots being formed in the second side wall, the second bearing walls being configured for bearing and supporting a curved liquid crystal display panel.

7. The mold frame for curved displaying as claimed in claim 5, wherein the number of the plurality of first engagement slots is at least four distributed in an extension direction of the first side wall in such a manner of being spaced from each other and symmetric with respect to a center of the first side wall, the first engagement slots and the first projection blocks being both rectangular.

8. The mold frame for curved displaying as claimed in claim 6, wherein the second bearing wall comprises a first step adjacent to the second side wall and a second step connected to the first step, the second step having a height less than height of the first step, the first bearing wall of each of the first side frame members having two ends each forming an extension, the extensions being positioned on the second steps of the second side plates.

9. A mold frame for curve displaying, which is adapted to be mounted to a curved backplane, wherein the curved backplane comprises two opposite curved first side plates and each of the first side plates comprises a plurality of first projection blocks formed therein, the mold frame comprising two opposite first side frame members and two opposite second side frame members respectively mounted to opposite ends of the two first side frame members, each of the first side frame members comprising a plurality of first engagement slots and open notches formed between two adjacent ones of the first engagement slots, the first engagement slots receiving and being coupled to the first projection blocks, the first side frame members being made of an elastic plastic material, the first side frame members showing a straight configuration before being mounted to the curved backplane and showing a curved configuration after being mounted to the curved backplane;

wherein the first side plates are in the form of a curved configuration and the plurality of first projection blocks defines a center connection line that is curved, whereby when each of the first side frame members is mounted to the first side plate, collaboration of the plurality of first engagement slots and the corresponding plurality of first projection blocks makes the first side frame member curved to a condition of having a curvature that is substantially corresponding to curvature of the center connection line of the plurality of first projection blocks;

wherein the curved backplane comprises two opposite second side plates, each of the second side plates comprising plurality of second projection blocks formed thereon, the second side frame members comprising a plurality of second engagement slots formed therein to correspond to the plurality of second projection blocks, the second side plates being set in an inclined condition, the second side frame members being made of an elastic plastic material and showing a flat configuration and being assembled to the second side plates by having the plurality of second engagement slots receiving and coupled to the plurality of second projection blocks; and wherein the elastic plastic material comprises a mixture of polycarbonate (PC) and glass fiber (GF), thermoplastic vulcanizate (TPV), or thermoplastic elastomer (TPE).

10. The mold frame for curved displaying as claimed in claim 9, wherein the first side frame members each comprises a first side wall and a first bearing wall perpendicularly connected to an inside surface of the first side wall, the first side walls being respectively mounted to the first side plates of the curved backplane, the plurality of first engagement slots being formed in the side walls, wherein the first side walls and the first bearing walls are both in a straight form before the first side walls are mounted to the first side plates and when the first side walls are mounted to the first side plates of the backplane, the first side walls force the first bearing walls connected thereto to curve to such a condition having a curvature substantially corresponding to curvature of the center connection line of the plurality of first projection blocks, the first bearing walls being configured for bearing and supporting a curved liquid crystal display panel.

11. The mold frame for curved displaying as claimed in claim 9, wherein the second side frame members each comprise a second side wall and a second bearing wall perpendicularly connected to an inside surface of the second side wall, the second side walls being mounted to the second side plates of the curved backplane, the plurality of second engagement slots being formed in the second side wall, the second bearing walls being configured for bearing and supporting a curved liquid crystal display panel.

12. The mold frame for curved displaying as claimed in claim 10, wherein the number of the plurality of first engagement slots is at least four distributed in an extension direction of the first side wall in such a manner of being spaced from each other and symmetric with respect to a center of the first side wall, the first engagement slots and the first projection blocks being both rectangular.

13. The mold frame for curved displaying as claimed in claim 11, wherein the second bearing wall comprises a first step adjacent to the second side wall and a second step connected to the first step, the second step having a height less than height of the first step, the first bearing wall of each of the first side frame members having two end each forming an extension, the extensions being positioned on the second steps of the second side plates.

14. A curved liquid crystal display device, comprising a backlight module, a mold frame mounted on the backlight module, a curved liquid crystal display panel mounted on the mold frame, and a curved bezel mounted on the curved liquid crystal display panel, the backlight module comprising a curved backplane and a curved light guide plate, a curved optical film assembly, and a backlight source arranged inside the curved backplane, the curved backplane comprising two opposite curved first side plates, each of the first side plates comprising a plurality of first projection blocks formed therein, the mold frame comprising two opposite first side frame members and two second side frame members respectively mounted to opposite ends of each of the two first side frame members, each of the first side frame members comprising a plurality of first engagement slots and open notches between two adjacent ones of the first engagement slots formed therein, the first engagement slots receiving and being coupled to the first projection blocks, the first side frame members being made of an elastic plastic material, the first side frame members showing a straight configuration before being assembled to the curved backplane and showing a curved configuration after being assembled with the curved backplane.

15. The curved liquid crystal display device as claimed in claim 14, wherein the curve backplane comprises a bottom board and a curved bracing mounted to the bottom board, the curved bracing being fixed by fastener to the bottom board of the backplane to force the bottom board and the first side plates to show a curved configuration.

* * * * *